United States Patent
Ueno et al.

(10) Patent No.: US 9,413,183 B2
(45) Date of Patent: Aug. 9, 2016

(54) QUICK CHARGING SYSTEM, CONTROL DEVICE, METHOD OF CONTROLLING AMOUNT OF THE STORED ELECTRICAL POWER, AND PROGRAM

(75) Inventors: Satoshi Ueno, Tokyo (JP); Yukari Tadokoro, Sagamihara (JP); Takeshi Fujita, Miura-gun (JP)

(73) Assignees: NEC CORPORATION, Toyko (JP); SHOWA SHELL SEKIYU K.K., Tokyo (JP); NISSAN MOTOR CO., LTD., Yokohama-shi (JP)

( * ) Notice: Subject to any disclaimer, the term of this patent is extended or adjusted under 35 U.S.C. 154(b) by 435 days.

(21) Appl. No.: 13/996,369

(22) PCT Filed: Dec. 16, 2011

(86) PCT No.: PCT/JP2011/007053
§ 371 (c)(1),
(2), (4) Date: Jun. 20, 2013

(87) PCT Pub. No.: WO2012/086167
PCT Pub. Date: Jun. 28, 2012

(65) Prior Publication Data
US 2013/0271064 A1    Oct. 17, 2013

(30) Foreign Application Priority Data

Dec. 21, 2010    (JP) ................................. 2010-284958

(51) Int. Cl.
*H02J 7/04* (2006.01)
*H02J 7/00* (2006.01)
(Continued)

(52) U.S. Cl.
CPC ........... *H02J 7/0054* (2013.01); *B60L 11/1816* (2013.01); *B60L 11/1824* (2013.01);
(Continued)

(58) Field of Classification Search
CPC .......................... H02J 7/0054; B60L 11/1824

USPC .................................. 320/101, 109, 140, 155
See application file for complete search history.

(56) References Cited

U.S. PATENT DOCUMENTS

| 2003/0047209 A1 | 3/2003 | Yanai et al. | |
| 2011/0109272 A1* | 5/2011 | Lee | G06F 1/28 320/132 |
| 2011/0133688 A1* | 6/2011 | Ishibashi | B60L 11/1809 320/101 |

FOREIGN PATENT DOCUMENTS

| JP | 2006-113892 A | 4/2006 |
| JP | 2008-131841 A | 6/2008 |

(Continued)

OTHER PUBLICATIONS

Communication dated Nov. 17, 2015, from the European Patent Office in counterpart European Application No. 11852114.5.

*Primary Examiner* — Drew A Dunn
*Assistant Examiner* — Zixuan Zhou
(74) *Attorney, Agent, or Firm* — Sughrue Mion, PLLC

(57) ABSTRACT

A control device (200) calculates, on the basis of the transition of the expected amount of power generation of a power generation unit (160), the transition of the expected amount of power supply of a power supply unit (110), and the current amount of stored electrical power of a storage battery (120), a transition of the expected amount of the stored electrical power of the storage battery (120) in a case where electrical power continues to be supplied from a power distribution network (300) to the storage battery (120). In addition, the control device (200) sets a power reduction time zone, which is a time zone in which no electrical power is supplied from the power distribution network (300) to the storage battery (120), when the presence of a first time, which is a time when the expected amount of the stored electrical power starts to exceed the first reference capacity, is shown in the transition of the expected amount of the stored electrical power of the storage battery (120), and sets the end time of the power reduction time zone as the first time.

20 Claims, 13 Drawing Sheets

(51) Int. Cl.
  *H01M 10/46* (2006.01)
  *H02J 1/14* (2006.01)
  *H02J 3/32* (2006.01)
  *B60L 11/18* (2006.01)
  *H01M 10/42* (2006.01)
  *H02J 7/35* (2006.01)

(52) U.S. Cl.
  CPC ............. *H01M10/46* (2013.01); *H02J 1/14* (2013.01); *H02J 3/32* (2013.01); *H02J 7/0027* (2013.01); *B60L 2210/10* (2013.01); *B60L 2210/30* (2013.01); *B60L 2230/30* (2013.01); *B60L 2240/70* (2013.01); *H01M 2010/4271* (2013.01); *H02J 7/35* (2013.01); *Y02E 60/721* (2013.01); *Y02T 10/7005* (2013.01); *Y02T 10/7055* (2013.01); *Y02T 10/7094* (2013.01); *Y02T 10/7216* (2013.01); *Y02T 10/7241* (2013.01); *Y02T 10/7291* (2013.01); *Y02T 10/92* (2013.01); *Y02T 90/121* (2013.01); *Y02T 90/127* (2013.01); *Y02T 90/14* (2013.01); *Y02T 90/16* (2013.01); *Y04S 10/126* (2013.01)

(56) References Cited

FOREIGN PATENT DOCUMENTS

| JP | 2008-172959 A | 7/2008 |
|----|---------------|--------|
| JP | 2010-041819 A | 2/2010 |

\* cited by examiner

| MONTH | TEMPLATE OF EXPECTED AMOUNT OF POWER SUPPLY | TEMPLATE OF EXPECTED AMOUNT OF POWER GENERATION |
|---|---|---|
| 12−2 | n001.×××  | s001.××× |
| 3−5 | n002.××× | s002.××× |
| 6−9 | n003.××× | s003.××× |
| 10−11 | n004.××× | s004.××× |

| TIME | POWER GENERATION UNIT (kw) | POWER DISTRIBUTION NETWORK (kw) | AMOUNT OF STORED ELECTRICAL POWER (kwh) | AMOUNT OF SUPPLY (kw) |
|---|---|---|---|---|
| 7:00 | 0.1 | 10.0 | 41.0 | 0.0 |
| 7:10 | 0.2 | 10.0 | 42.7 | 0.0 |
| 7:20 | 0.3 | 10.0 | 44.4 | 0.0 |
| 7:30 | 0.5 | 10.0 | 46.2 | 0.0 |
| 7:40 | 0.6 | 10.0 | 47.9 | 0.0 |
| 7:50 | 0.8 | 10.0 | 49.7 | 0.0 |
| 8:00 | 0.9 | 10.0 | 51.6 | 0.0 |

(b)

| TIME | POWER GENERATION UNIT (kw) | POWER DISTRIBUTION NETWORK (kw) | AMOUNT OF STORED ELECTRICAL POWER (kwh) | AMOUNT OF SUPPLY (kw) |
|---|---|---|---|---|
| 7:00 | 0.1 | 10.0 | 41.0 | 0.0 |
| 7:10 | 0.2 | 10.0 | 42.7 | 0.0 |
| 7:20 | 0.3 | 10.0 | 44.4 | 0.0 |
| 7:30 | 0.5 | 10.0 | 46.2 | 0.0 |
| 7:40 | 0.6 | 0.0 | 48.1 | 0.0 |
| 7:50 | 0.8 | 0.0 | 48.2 | 0.0 |
| 8:00 | 0.9 | 0.0 | 48.4 | 0.0 |

QUICK CHARGING SYSTEM, CONTROL DEVICE, METHOD OF CONTROLLING AMOUNT OF THE STORED ELECTRICAL POWER, AND PROGRAM

CROSS REFERENCE TO RELATED APPLICATIONS

This application is a National Stage of International Application No. PCT/JP2011/007053 filed Dec. 16, 2011, claiming priority based on Japanese Patent Application No. 2010-284958, filed Dec. 21, 2010, the contents of all of which are incorporated herein by reference in their entirety.

TECHNICAL FIELD

The present invention relates to a quick charging system that supplies electrical power stored in a storage battery to a battery of another apparatus, a control device, a method of controlling the amount of the stored electrical power, and a program.

BACKGROUND ART

In recent years, electrical vehicles have been developed in order to reduce the impact on the environment. Meanwhile, in order to spread the use of electrical vehicles, it is necessary to develop a power station to supply electrical power to electrical vehicles. On the other hand, in order to reduce the load on the environment, taking advantage of recycling energy, such as solar power generation, has been in demand.

Patent Document 1 discloses storing electrical power by solar power generation and wind power generation and charging the storage battery of an electrical vehicle using the stored electrical power.

RELATED DOCUMENT

Patent Document

[Patent Document 1] Japanese Unexamined Patent Publication No. 2008-131841

DISCLOSURE OF THE INVENTION

When charging a battery provided in an apparatus, such as an electrical vehicle, with electrical power, if the battery is charged directly from the power distribution network built by the power company or the power generator that generates electrical power using renewable energy, the amount of electrical power per unit time supplied from the power distribution network becomes too large. For this reason, it is desirable to charge a storage battery with electrical power in advance and charge the battery of the apparatus from this storage battery. In order to suppress insufficiency of the amount of stored electrical power of the storage battery, it is preferable to maintain the amount of the stored electrical power of the storage battery at 100% all the time. However, if the supply of electrical power from the power distribution network is controlled such that the amount of the stored electrical power of the storage battery is always 100%, a timing, at which the storage battery cannot be charged with electrical power generated using renewable energy, may occur.

It is an object of the present invention to provide a quick charging system, a control device, a method of controlling the amount of the stored electrical power, and a program, which are capable of storing electrical power, which is generated using renewable energy, to the fullest extent in a power storage unit and that can suppress insufficiency of the amount of the stored electrical power of the power storage unit when supplying electrical power to a battery.

According to the present invention, there is provided a quick charging system comprising: a power storage unit; a power supply unit that supplies electrical power stored in the power storage unit to a battery of another apparatus; a power distribution unit that distributes electrical power of a power distribution network to the power storage unit so as to store the electrical power in the power storage unit; a power generation unit that generates electrical power using renewable energy and stores the generated electrical power in the power storage unit; and a control unit that controls the power distribution unit, wherein the control unit performing: a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and electrical power continues to be supplied from the power distribution network to the power storage unit according to settings, and a second process of setting a power reduction time zone, which is a time zone in which a supply of electrical power from the power distribution unit to the power storage unit is reduced or interrupted, when presence of a first time, which is a time when the expected amount of the stored electrical power starts to exceed a first reference capacity, is shown in the transition of the expected amount of the stored electrical power of the power storage unit.

According to the present invention, there is provided a quick charging system comprising: a power storage unit; a power supply unit that supplies electrical power stored in the power storage unit to a battery of another apparatus; a power distribution unit that distributes electrical power of a power distribution network to the power storage unit so as to store the electrical power in the power storage unit; a power generation unit that generates electrical power using renewable energy and stores the generated electrical power in the power storage unit; and a control unit that controls the power distribution unit, wherein the control unit performing: a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and electrical power continues to be supplied from the power distribution network to the power storage unit according to settings, and a second process of setting a power supply time zone, which is a time zone in which a supply of electrical power from the power distribution unit to the power storage unit is performed, when presence of a second time, which is a time when the expected amount of the stored electrical power starts to be less than a second reference capacity, is shown in the transition of the expected amount of the stored electrical power of the power storage unit.

According to the present invention, there is provided a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, wherein a first process is performed, which process calculates a transition of an expected amount of stored electrical power of the power storage unit on the basis of a transition of an expected amount of power generation of the power generation unit, a transition of an expected amount of power supply of the power supply unit, and a current amount of stored electrical power of the power storage unit, in a case where each of the expected amount of power generation and the expected amount of power supply follows the transition and electrical power continues to be supplied from the power distribution network to the power storage unit according to settings, and wherein a second process is performed, which process sets a power reduction time zone, which is a time zone in which an amount of power supply from the power distribution unit to the power storage unit is reduced or interrupted, when presence of a first time, which is a time when the expected amount of the stored electrical power starts to exceed a first reference capacity, is shown in the transition of the expected amount of the stored electrical power of the power storage unit.

According to the present invention, there is provided a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, wherein a first process is performed, which process calculates a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and a supply of electrical power from the power distribution network to the power storage unit continues to be interrupted according to settings, wherein a second process is performed, which process sets a power supply time zone, which is a time zone in which a supply of electrical power from the power distribution unit to the power storage unit is performed, when presence of a second time, which is a time when the expected amount of the stored electrical power starts to be less than a second reference capacity, is shown in the transition of the expected amount of the stored electrical power of the power storage unit.

According to the present invention, there is provided a method of controlling, using a control device, an amount of stored electrical power in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit, wherein the control device performs a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the expected amount of power generation and the expected amount of power supply follows the transition and electrical power continues to be supplied from the power distribution network to the power storage unit according to settings, and wherein the control device performs a second process of setting a power reduction time zone, which is a time zone in which an amount of power supply from the power distribution unit to the power storage unit is reduced or interrupted, when presence of a first time, which is a time when the expected amount of the stored electrical power starts to exceed a first reference capacity, is shown in the transition of the expected amount of the stored electrical power of the power storage unit.

According to the present invention, there is provided a method of controlling, using a control device, an amount of stored electrical power in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit, wherein the control device performs a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where when each of the amount of power generation of the power generation unit and the amount of power supply of the power supply unit follows the transition and a supply of electrical power from the power distribution network to the power storage unit continues to be interrupted according to settings, and wherein the control device performs a second process of setting a power supply time zone, which is a time zone in which a supply of electrical power from the power distribution unit to the power storage unit is performed, when presence of a second time, which is a time when the expected amount of the stored electrical power starts to be less than a second reference capacity, is shown in the transition of the expected amount of the stored electrical power of the power storage unit.

According to the present invention, there is provided a program for implementing a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, the program causing a computer to implement: a first function of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the expected amount of power generation and the expected amount of power supply follows the transition and electrical power continues to be supplied from the power distribution network to the power storage unit according to settings; and a second function of setting a power reduction time zone, which is a time zone in which an amount of power supply from the power distribution unit to the power storage unit is reduced or interrupted, when presence of a first time, which is a time when the expected amount of the stored electrical power starts to exceed a first reference capacity, is shown in the transition of the expected amount of the stored electrical power of the power storage unit.

According to the present invention, there is provided a program for implementing a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, the program causing a computer to implement: a first function of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and a supply of electrical power from the power distribution network to the power storage unit continues to be interrupted according to settings; and a second function of setting a power supply time zone, which is a time zone in which a supply of electrical power from the power distribution unit to the power storage unit is performed, when presence of a second time, which is a time when the expected amount of the stored electrical power starts to be less than a second reference capacity, is shown in the transition of the expected amount of the stored electrical power of the power storage unit.

According to the present invention, electrical power generated using renewable energy can be stored to the fullest extent in the power storage unit, and it is suppressed that the amount of the stored electrical power of the power storage unit becomes insufficient when supplying electrical power to the battery.

BRIEF DESCRIPTION OF THE DRAWINGS

The above-described object and other objects, features, and advantages will become more apparent by preferred embodiments described below and the following accompanying drawings.

FIG. 2 is a diagram showing the configuration of data stored in a template storage unit in a table format.

FIG. 6 is a table diagram for explaining the process shown in FIG. 5 in detail.

DESCRIPTION OF EMBODIMENTS

Figure 1:
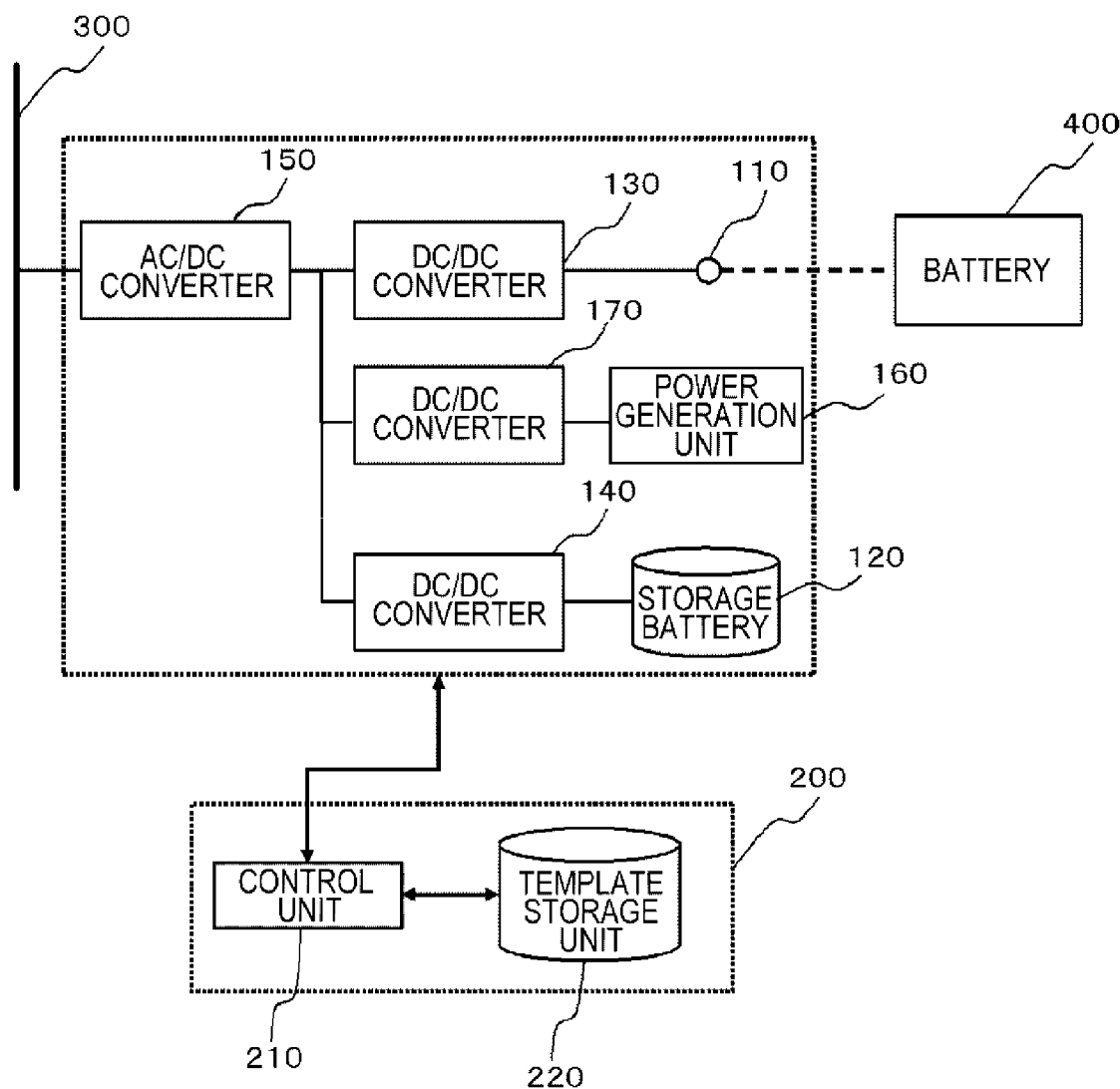
FIG. 1 is a block diagram showing the configuration of a quick charging system according to a first embodiment.

Hereinafter, embodiments of the present invention will be described with reference to the drawings. In addition, the same components are denoted by the same reference numerals in all drawings, and explanation thereof will not be repeated.

(First Embodiment)

FIG. 1 is a block diagram showing the configuration of a quick charging system according to a first embodiment. This quick charging system includes a storage battery 120, a power supply unit 110, a power distribution unit (AC/DC converter) 150, a power generation unit 160, and a control device 200. The power supply unit 110 supplies electrical power stored in the storage battery 120 to a battery 400 of another apparatus. The AC/DC converter 150 distributes electrical power of a power distribution network 300 to the storage battery 120 so as to store the electrical power in the storage battery 120. The power generation unit 160 generates electrical power using renewable energy, and stores the generated electrical power in the storage battery 120. For example, the power generation unit 160 is a solar battery. However, the power generation unit 160 may be an aerogenerator. The control device 200 controls the supply of electrical power from the power distribution network 300 to the storage battery 120 by controlling the AC/DC converter 150 or a DC/DC converter 140. In addition, the amount of power generation by the power generation unit 160 cannot be controlled by the control device 200 in principle.

On the basis of the transition of the expected amount of power generation of the power generation unit 160, the transition of the expected amount of power supply of the power supply unit 110, and the current amount of the stored electrical power of the storage battery 120, the control device 200 calculates a transition of the expected amount of the stored electrical power of the storage battery 120 when each of the amount of power generation of the power generation unit 160 and the amount of power supply of the power supply unit 110 follows the expected transition and electrical power continues to be supplied from the power distribution network 300 to the storage battery 120 according to settings. In addition, the control device 200 sets a power reduction time zone, which is a time zone in which the supply of electrical power from the power distribution unit 300 to the storage battery 120 is reduced or interrupted, when the presence of the first time, which is a time when the expected amount of the stored electrical power starts to exceed the first reference capacity, is shown in the transition of the expected amount of the stored electrical power of the storage battery 120. The end time of the power supply time zone is the first time, for example. Accordingly, electrical power generated by the power generation unit 160 can be stored to the fullest extent in the storage battery 120, and it is suppressed that the amount of the stored electrical power of the storage battery 120 becomes insufficient when supplying electrical power to the battery 400. Hereinafter, detailed explanation will be given.

The power distribution network 300 is, for example, a power distribution network for a power company to supply electrical power, and is an AC power supply. On the other hand, the storage battery 120 is a DC power supply. Accordingly, the AC/DC converter 150 and the DC/DC converter 140 are provided in this order between the power distribution network 300 and the storage battery 120. In addition, the storage battery 120 is connected to the power supply unit 110 through the DC/DC converter 140 and a DC/DC converter 130. The control device 200 supplies electrical power from the storage battery 120 to the battery 400 by controlling the DC/DC converter 140. In addition, the control device 200 controls the supply of electrical power from the power distribution network 300 to the storage battery 120 by controlling the AC/DC converter 150 and the DC/DC converter 140.

A DC/DC converter 170 is provided between the power generation unit 160 and the DC/DC converter 140. The power generation unit 160 stores generated electrical power in the storage battery 120 through the DC/DC converters 170 and 140.

The control device 200 has a control unit 210 and a template storage unit 220. The control unit 210 controls each converter described above. The template storage unit 220 stores first template data showing a standard transition of the amount of power supply by the power supply unit 110 and second template data showing a standard transition of the amount of power generation by the power generation unit 160. The first template data shows how the amount of power supply per unit time in a day changes, for example. The second template data shows how the amount of power generation per unit time in a day changes, for example. The control unit 210 controls the supply of electrical power from the power distribution network 300 to the storage battery 120 using these pieces of template data as will be described later. In addition, the control unit 210 makes the amount of the stored electrical power per unit time the fixed amount, for example, a maximum value when supplying electrical power from the power distribution network 300 to the storage battery 120 in order to charge the storage battery 120.

This quick charging system is used, for example, as a power station for electrical vehicles. In this case, the battery 400 is a battery of an electrical vehicle.

In addition, each component of the control device 200 shown in FIG. 1 is not a configuration in a hardware unit but a block in a functional unit. Each component of the control device 200 is implemented with any combination of hardware and software based on a CPU of any computer, a memory, a program for implementing a component of this drawing which is loaded into the memory, a storage unit such as a hard disk to store the program, and an interface for network connection. In addition, there are various modifications in the implementation method and the apparatus.

FIG. 2 is a diagram showing the configuration of data stored in the template storage unit 220 in a table format. The template storage unit 220 stores the first template data (template of the expected amount of power supply) and the second template data (template of the expected amount of power generation) for each period of time. Here, for example, "period of time" may be set in a month unit, may be a month and day unit, or may be a day-of-the-week unit. In addition, template data may be set in a day-of-the-week unit of each month.

Figure 3:
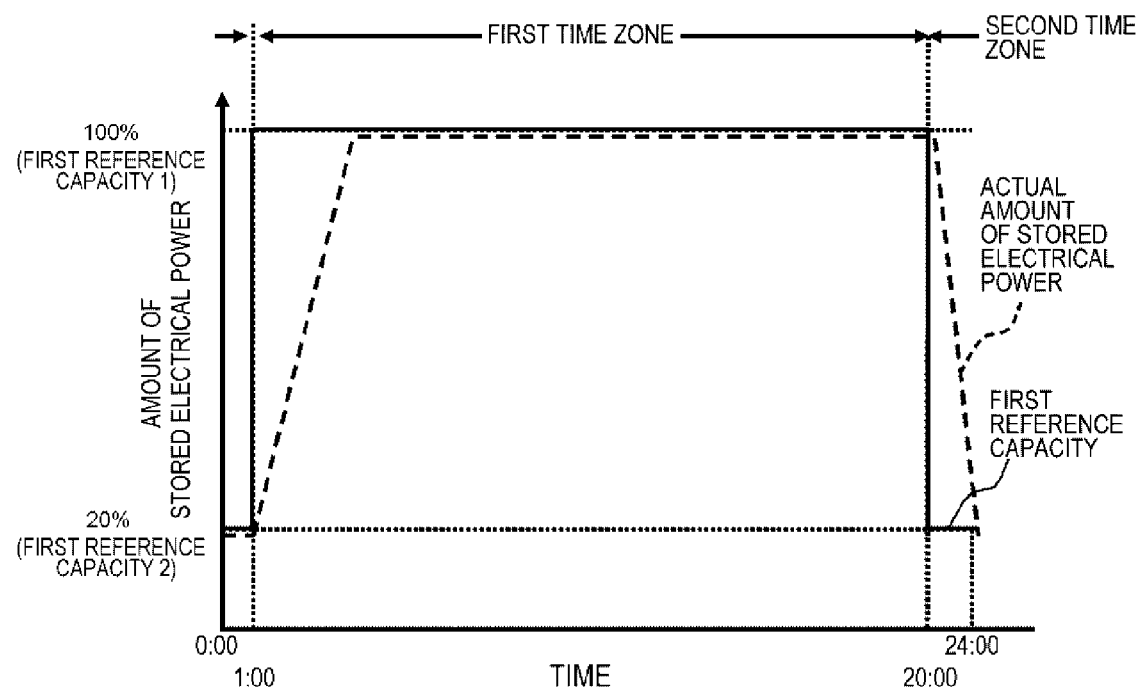
FIG. 3 is a chart for explaining the outline of a method of controlling the amount of the stored electrical power of a storage battery by a control device.

FIG. 3 is a chart for explaining the outline of a method of controlling the amount of the stored electrical power of the storage battery 120 by the control device 200. As described above, the quick charging system calculates the transition of the expected amount of the stored electrical power of the storage battery 120 in a case where it is continued to supply electrical power from the power distribution network 300 to the storage battery 120 on the basis of the expected amount of power generation of the power generation unit 160 and the expected amount of power supply by the power supply unit 110. In addition, the control device 200 controls the supply of electrical power from the power distribution network 300 to the storage battery 120 so that the expected amount of the stored electrical power does not exceed the first reference capacity.

In the present embodiment, the control device 200 has a first value (first reference capacity 1) and a second value (first reference capacity 2) as the first reference capacity. The first reference capacity 1 is used in a first time zone. The first reference capacity 2 is used in a second time zone later than the first time zone. In addition, the first reference capacity 1 is the maximum capacity (100%) of the storage battery 120, and the first reference capacity 2 is the minimum amount required in the quick charging system. Although this value changes depending on the application and location of the quick charging system, for example, the value is equal to or less than the half of the maximum capacity of the storage battery 120 (50% or less).

Specifically, the second time zone is immediately before a time zone in which the midnight power rate is applied as the rate of electrical power supplied from the power distribution network 300. In addition, the first time zone is a time zone excluding the second time zone in a day. In addition, although the start time of the second time zone is set to 20:00 in FIG. 3, it is variable since this time is set through a control.

Thus, the control device 200 sets the first reference capacity to the first reference capacity 2, which is relatively low, immediately before the time zone in which the midnight power rate is applied. For this reason, the amount of the stored electrical power of the storage battery 120 is reduced immediately before the time zone in which the midnight power rate is applied. In addition, when the time zone in which the midnight power rate is applied starts, the control device 200 sets the first reference capacity 1, which is relatively high, as the first reference capacity. Therefore, in the time zone in which the midnight power rate is applied, the amount of electrical power supplied from the power distribution network 300 to the storage battery 120 can be increased.

Figure 4:
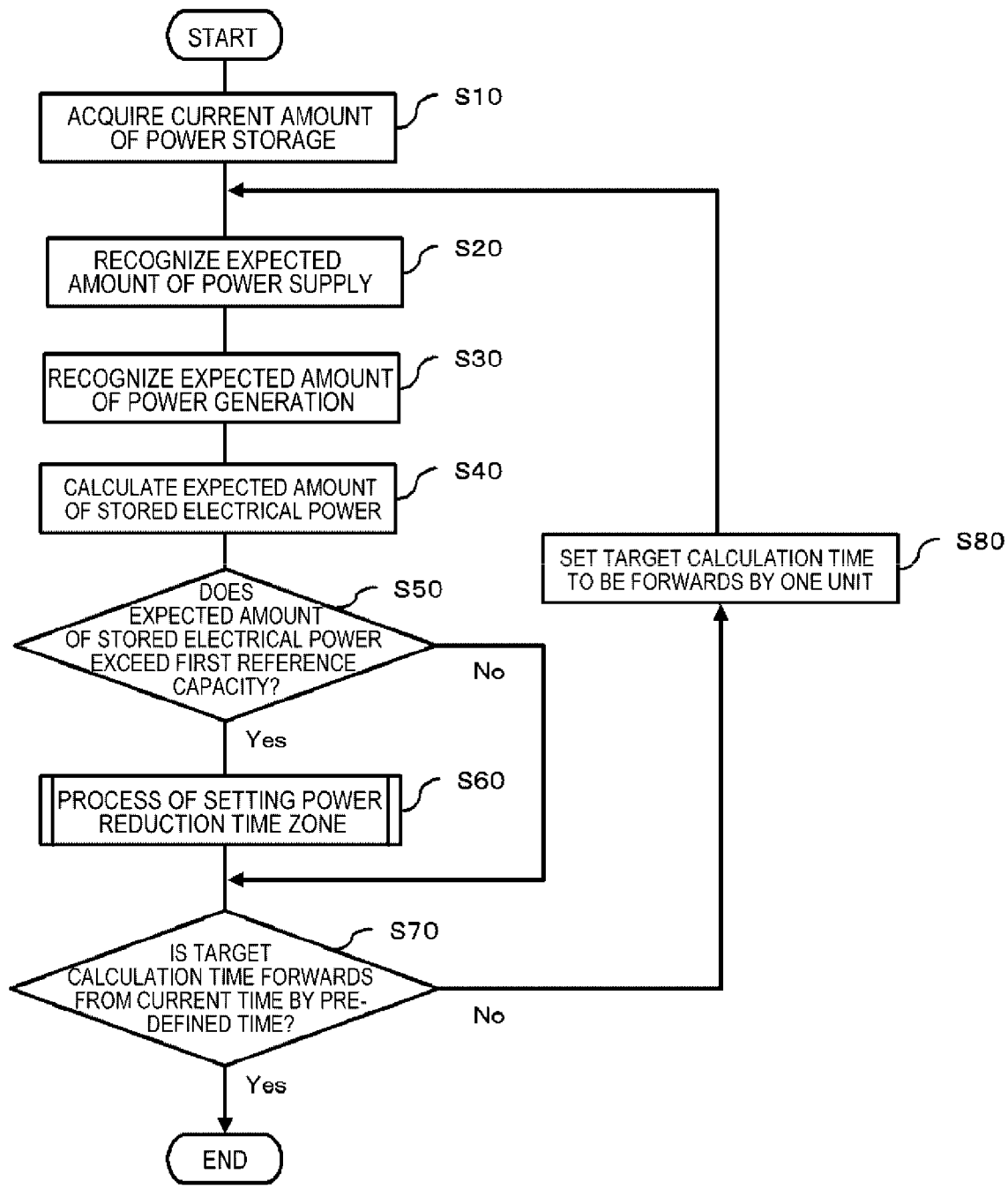
FIG. 4 is a flow chart illustrating the first control performed by a control unit of the control device.

FIG. 4 is a flow chart illustrating the first control performed by the control unit 210 of the control device 200. This drawing shows a process of setting the power reduction time zone. The control unit 210 performs the process shown in FIG. 4 every fixed time, for example, every tens of milliseconds to hundreds of milliseconds.

First, the control unit 210 sets a time, which is one unit time (for example, 10 minutes) later than the current time, as the target calculation time. In addition, the control unit 210 recognizes the target calculation time to determine whether to use the first reference capacity 1 or the first reference capacity 2 as the first reference capacity.

Then, the control unit 210 acquires the current amount of the stored electrical power of the storage battery 120 from the storage battery 120 (step S10). Then, the control unit 210 reads the first template data from the template storage unit 220, and calculates the expected amount of power supply by the power supply unit 110 in a period from the current time to the target calculation time, that is, the expected value of electrical power which needed to be supplied from the storage battery 120 to the battery 400 (step S20). In addition, the control unit 210 reads the second template data from the template storage unit 220, and calculates the expected amount of power generation by the power generation unit 160 in a period from the current time to the target calculation time (step S30).

In addition, the control unit 210 calculates the amount of power supply from the power distribution network 300 to the storage battery 120 on the assumption that electrical power is always supplied from the power distribution network 300 to the storage battery 120 in a period from the current time to the target calculation time. In addition, when the power reduction time zone is already set, the control unit 210 calculates the amount of power supply from the power distribution network 300 to the storage battery 120 on the assumption that no electrical power is supplied in the power reduction time zone.

In addition, the control unit 210 adds the calculated amount of power supply and the expected amount of power generation calculated in step S30 to the current amount of the stored electrical power, and reduces the expected amount of power supply calculated in step S20 from this value. In this manner, the control unit 210 calculates the expected amount of the stored electrical power at the target calculation time (step S40).

The control unit 210 determines whether or not the expected amount of the stored electrical power calculated in step S40 exceeds the first reference capacity (step S50). When the expected amount of the stored electrical power exceeds the first reference capacity (step S50: Yes), the control unit 210 performs a process of setting the power reduction time zone that is a time zone in which no electrical power is supplied from the power distribution network 300 to the storage battery 120 (step S60), and then proceeds to step S70. When the expected amount of the stored electrical power does not exceed the first reference capacity (step S50: No), the control unit 210 proceeds to step S70.

In step S70, the control unit 210 determines whether or not the target calculation time is ahead of the current time by a pre-defined time, for example, by 24 hours. When the target calculation time is ahead of the current time by the pre-defined time (step S70: Yes), the control unit 210 ends the process. When the target calculation time is not ahead of the current time by the time set in advance (step S70: No), the control unit 210 sets the target calculation time to be forwards by one unit time (for example, 10 minutes) (step S80), and then returns to step S20.

Figure 5:
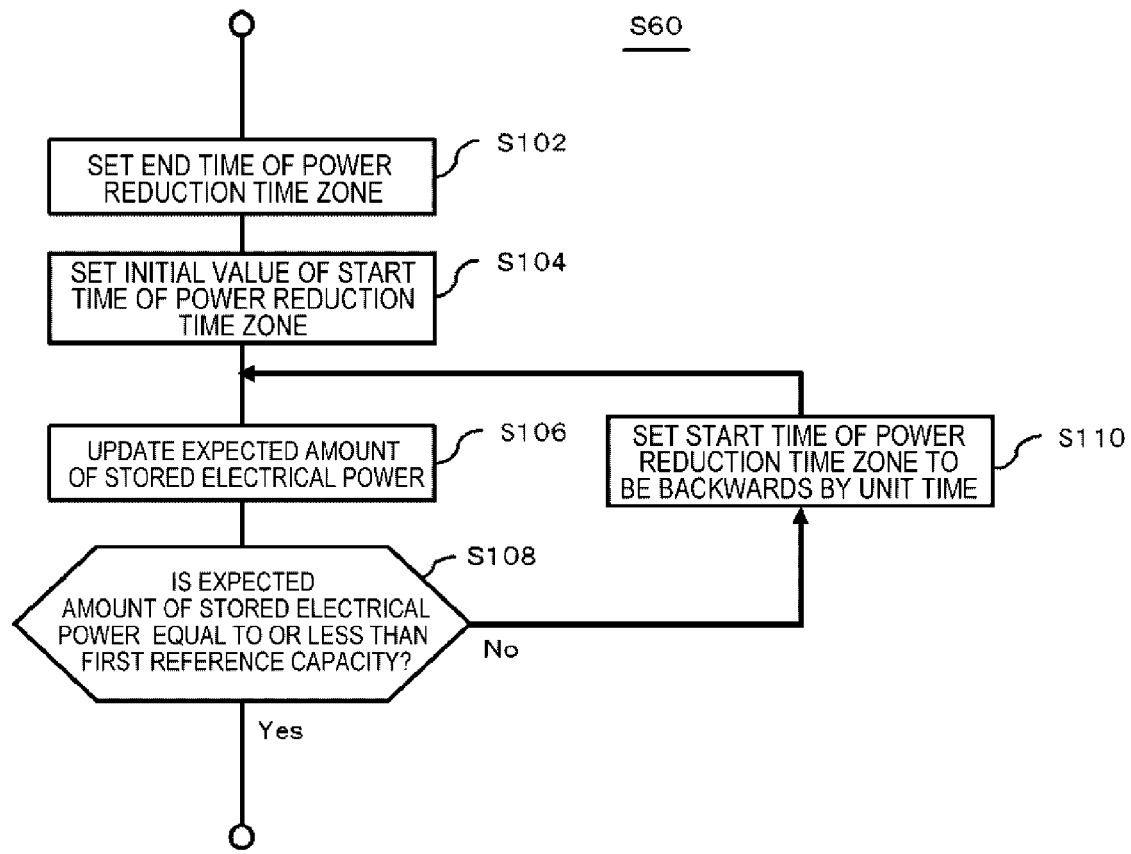
FIG. 5 is a flow chart showing the details of step S60 in FIG. 4.

FIG. 5 is a flow chart showing the details of step S60 in FIG. 4, that is, the process of setting the power reduction time zone. First, the control unit 210 sets the end time of the power reduction time zone as the current target calculation time (step S102).

Then, the control unit 210 sets a time, which is one unit time (for example, 10 minutes) earlier than the current target calculation time, as an initial value of the start time of the power reduction time zone (step S104). Then, the control unit 210 calculates the amount of power supply from the power distribution network 300 to the storage battery 120 in a period from the current time to the target calculation time after setting the power reduction time zone. In addition, the control unit 210 adds the calculated amount of power supply and the expected amount of power generation calculated in step S30 to the current amount of the stored electrical power, and subtracts from this value the expected amount of power supply calculated in step S20. In this manner, the control unit 210 calculates an updated value of the expected amount of the stored electrical power at the target calculation time (step S106).

When the expected amount of the stored electrical power after updating is equal to or less than the first reference capacity (step S108: Yes), the control unit 210 ends the process of setting the power reduction time zone. In addition, when the expected amount of the stored electrical power after updating exceeds the first reference capacity (step S108: No), the control unit 210 sets the start time of the power reduction time zone to be backwards by one unit time (step S110), and then returns to step S106.

FIG. 6 is a table diagram for explaining the process shown in FIG. 5 in detail. In the example shown in this drawing, the current time is 7:00, and the current amount of the stored electrical power of the storage battery 120 is 41 kwh. In addition, the maximum capacity of the storage battery 120 is 50 kwh, and 50 kwh is set as the first reference capacity.

In the example shown in this drawing, the control unit 210 calculates the expected amount of the stored electrical power at each time in units of 10 minutes. In addition, as shown in FIG. 6($a$), since the expected amount of the stored electrical power is equal to or less than the first reference capacity (equal to or less than 50 kwh) until the target calculation time reaches 7:50, the process shown in FIG. 5 is not performed.

However, as shown in FIG. 6($a$), when the target calculation time becomes 8:00, the expected amount of the stored electrical power at 8:00 exceeds the first reference capacity. Accordingly, the process shown in FIG. 5 is performed. Specifically, the control unit 210 sets the amount of power supply from the power distribution network in a period from 7:50 to 8:00 to 0. Nevertheless, the expected amount of the stored electrical power at 8:00 exceeds the first reference capacity. Accordingly, the control unit 210 also sets the amount of power supply from the power distribution network in a period from 7:40 to 7:50 to 0. Nevertheless, the expected amount of the stored electrical power at 8:00 exceeds the first reference capacity. Accordingly, the control unit 210 also sets the amount of power supply from the power distribution network in a period from 7:30 to 7:40 to 0. As a result, as shown in FIG. 6($b$), the expected amount of the stored electrical power at 8:00 becomes equal to or less than the first reference capacity. Accordingly, the control unit 210 ends the process shown in FIG. 5.

Figure 7:
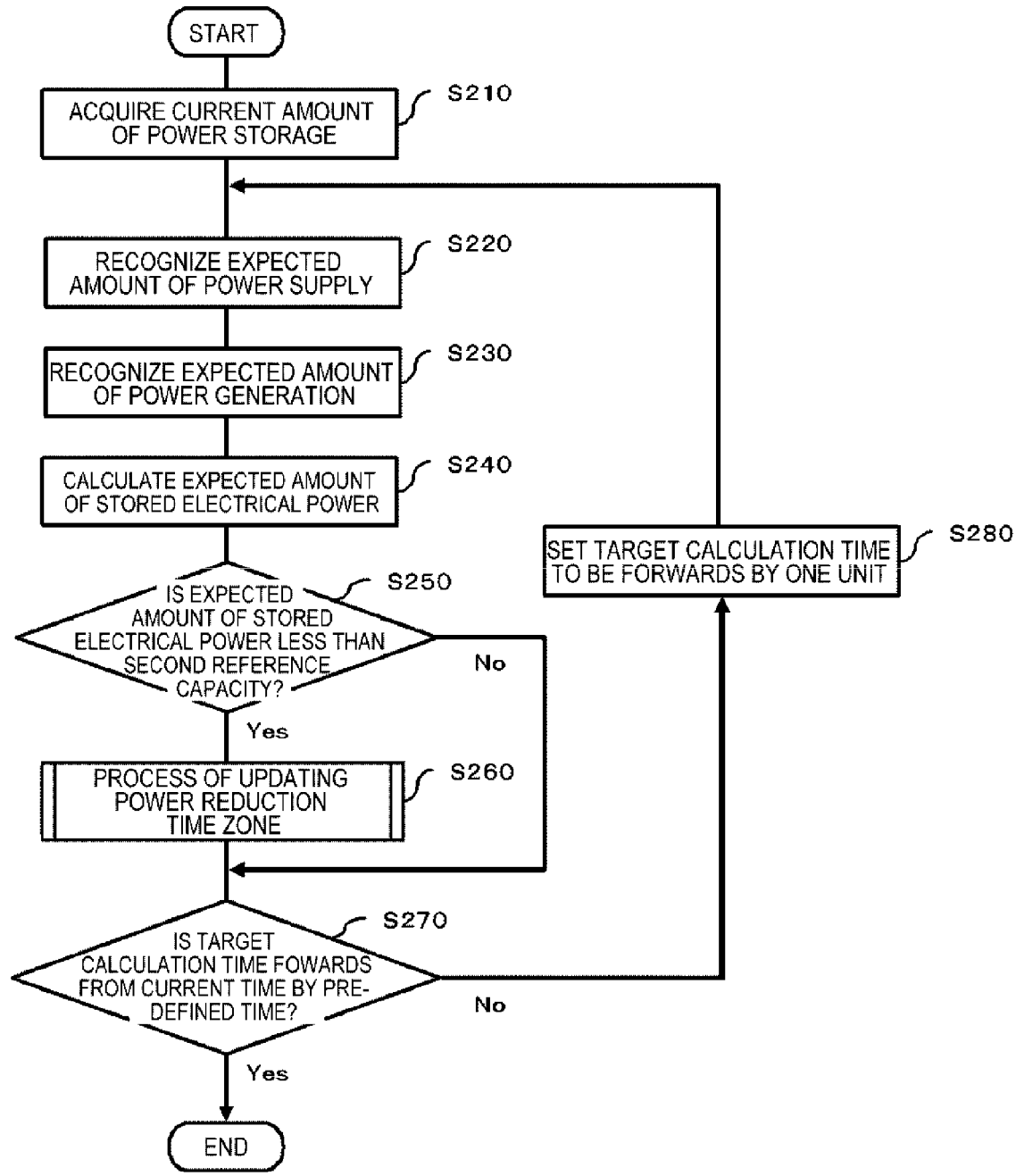
FIG. 7 is a flow chart illustrating the second control performed by the control unit of the control device.

FIG. 7 is a flow chart illustrating the second control performed by the control unit 210 of the control device 200. In the process shown in FIGS. 4 to 6, the control unit 210 determines only whether or not the capacity of the storage battery 120 exceeds the first reference capacity. For this reason, when the amount of power generation by the power generation unit 160 is less than the expected value or when the amount of power supply from the storage battery 120 to the battery 400 exceeds the expected value, the amount of the stored electrical power of the storage battery 120 becomes insufficient. As a result, electrical power may not be able to be supplied to the battery 400. In such a case, it is necessary to shorten the power reduction time zone set in the process shown in FIGS. 4 and 5. FIG. 7 is a process of shortening the set power reduction time zone. The control unit 210 performs the process shown in FIG. 7 every fixed time, for example, every tens of milliseconds to hundreds of milliseconds.

First, the control unit 210 sets a time, which is one unit time (for example, 10 minutes) later than the current time, as the target calculation time. In addition, the control unit 210 recognizes the second reference capacity. The second reference capacity is an amount that causes a problem in the supply of electrical power to the battery 400 when the capacity of the storage battery 120 becomes lower than the amount, and is set to a lower value than the first reference capacity 1 described above.

Then, the control unit 210 acquires the current amount of the stored electrical power of the storage battery 120 from the storage battery 120 (step S210). Then, the control unit 210 by reads the first template data from the template storage unit 220 and calculates the expected amount of power supply in a period from the current time to the target calculation time (step S220). In addition, the control unit 210 reads the second template data from the template storage unit 220 and calculates the expected amount of power generation in a period from the current time to the target calculation time (step S230).

Note that, when the processing result of steps S10 to S30 shown in FIG. 4 remains in the control unit 210, the process of steps S210 to S230 may be omitted.

In addition, the control unit 210 calculates the amount of power supply from the power distribution network 300 to the storage battery 120 on the assumption that electrical power is always supplied from the power distribution network 300 to the storage battery 120 in a period from the current time to the target calculation time excluding the power reduction time zone. In addition, the control unit 210 adds the calculated amount of power supply and the expected amount of power generation calculated in step S230 to the current amount of the stored electrical power, and subtracts from this value the expected amount of power supply calculated in step S220. In this manner, the control unit 210 calculates the expected amount of the stored electrical power at the target calculation time (step S240).

Here, the control unit 210 determines whether or not the expected amount of the stored electrical power calculated in step S240 is less than the second reference capacity (step S250). When the expected amount of the stored electrical power calculated in step S240 is less than the second reference capacity (step S250: Yes), the control unit 210 performs a process (an update process) of shortening the power reduction time zone (step S260), and then proceeds to step S270. In addition, when the expected amount of the stored electrical power calculated in step S240 is not less than the second reference capacity (step S250: No), the control unit 210 proceeds to step S270.

In step S270, the control unit 210 determines whether or not the target calculation time is forwards by a pre-defined time, for example, by 24 hours. When the target calculation time is forwards by the pre-defined time (step S270: Yes), the control unit 210 ends the process. When the target calculation time is not forwards by the pre-defined time (step S270: No), the control unit 210 sets the target calculation time to be forwards by one unit time (for example, 10 minutes) (step S280), and then returns to step S220.

Figure 8:
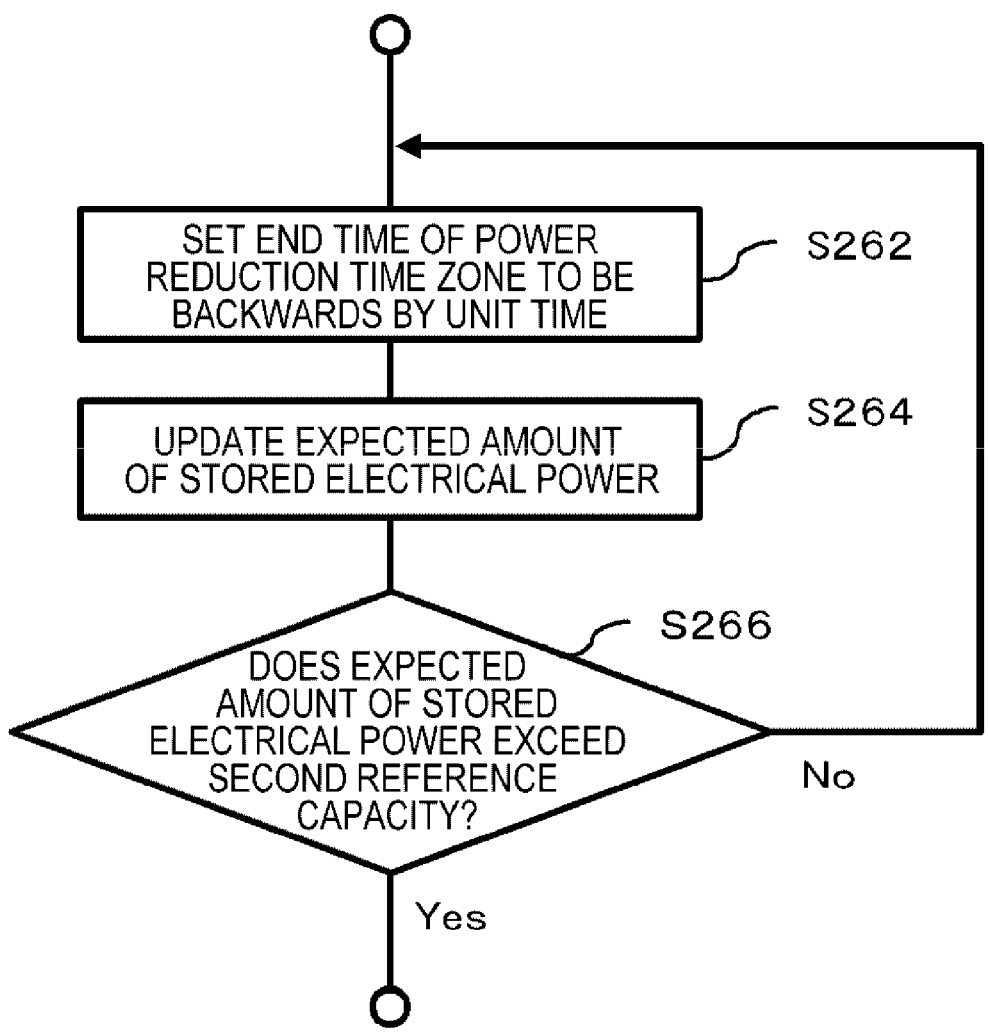
FIG. 8 is a flow chart showing the details of step S260 in FIG. 7.

FIG. 8 is a flow chart showing the details of step S260 in FIG. 7, that is, the process of shortening the power reduction time zone. First, the control unit 210 sets the end time of the power reduction time zone to be forwards by one unit time, for example, by 10 minutes (step S262). Then, the control unit 210 calculates the amount of power supply from the power distribution network 300 to the storage battery 120 in a period from the current time to the target calculation time after shortening the power reduction time zone. Then, the control unit 210 adds the calculated amount of power supply and the expected amount of power generation calculated in step S230 to the current amount of the stored electrical power, and subtracts from this value the expected amount of power supply calculated in step S220. In this manner, the control unit 210 calculates the updated value of the expected amount of the stored electrical power at the target calculation time (step S264).

When the expected amount of the stored electrical power after updating is equal to or greater than the second reference capacity (step S266: Yes), the control unit 210 ends the process of shortening the power reduction time zone. In addition, when the expected amount of the stored electrical power after updating is also less than the second reference capacity (step S266: No), the control unit 210 returns to step S262.

Note that, in step S262, the start time of the power reduction time zone may be delayed by one unit time, for example, by 10 minutes.

Next, operations and effects of the present embodiment will be described. In the present embodiment, the control unit 210 of the control device 200 calculates the expected amount of the stored electrical power of the storage battery 120 at the target calculation time. In this expected amount of the stored electrical power, the expected amount of power generation of the power generation unit 160 is taken into account. In addition, the control device 210 controls the amount of power supply from the power distribution network 300 to the storage battery 120 so that the expected amount of the stored electrical power does not exceed the first reference capacity. Accordingly, electrical power generated by the power generation unit 160 using renewable energy can be stored to the fullest extent in the storage battery 120. In addition, by setting the first reference capacity to a high value, for example, to the maximum capacity of the storage battery 120, it is suppressed that the amount of the stored electrical power of the storage battery 120 becomes insufficient when electrical power is supplied to the battery 400.

In addition, the control unit 210 sets the first reference capacity to the first reference capacity 2, which is relatively low, immediately before the time zone in which the midnight power rate is applied, and sets the first reference capacity to the first reference capacity 1, which is relatively high, after entering the time zone in which the midnight power rate is applied. Therefore, in the time zone in which the midnight power rate is applied, the amount of electrical power supplied from the power distribution network 300 to the storage battery 120 can be increased.

In addition, the second reference capacity is set in the control unit 210. The second reference capacity is a lower value than the first reference capacity, and is a value that causes a problem in the supply of electrical power to the battery 400 when the capacity of the storage battery 120 becomes lower than the value. In addition, after setting the power reduction time zone, the control unit 210 shortens the power reduction time zone as necessary so that the expected amount of the stored electrical power of the storage battery 120 does not become less than the second reference capacity. Therefore, it is suppressed that the amount of the stored electrical power of the storage battery 120 becomes insufficient.

(Second Embodiment)

Figure 9:
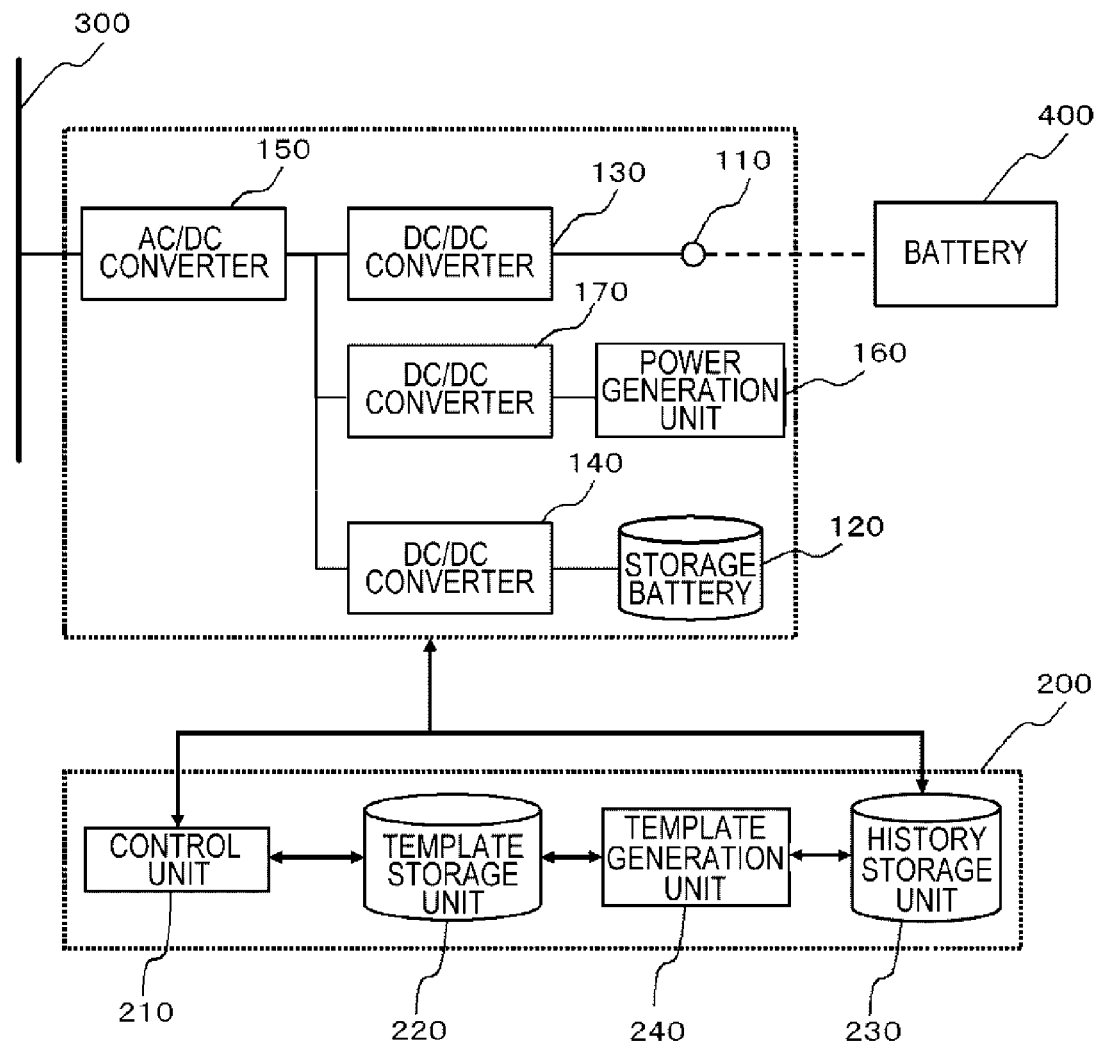
FIG. 9 is a block diagram showing the configuration of a quick charging system according to a second embodiment.

FIG. 9 is a block diagram showing the configuration of a quick charging system according to a second embodiment. The quick charging system according to the present embodiment is the same as the quick charging system according to the first embodiment except that a history storage unit 230 and a template generation unit 240 are included.

The history storage unit 230 acquires history data of each of the amount of power supply by the power supply unit 110 from the power supply unit 100 and the amount of power generation by the power generation unit 160 from the power generation unit 160, and stores the history data. The template generation unit 240 periodically generates the template data of each of the amount of power supply and the amount of power generation on the basis of the history data stored in the history storage unit 230, and updates the template data stored in the template storage unit 220. The template generation unit 240 generates a template, for example, by averaging the history data for each period of time.

Also in the present embodiment, the same effects as in the first embodiment can be obtained. In addition, the template generation unit 240 periodically updates the template data, which is stored in the template storage unit 220, using the history data. Therefore, the accuracy of control by the control unit 210 is increased.

(Third Embodiment)

FIGS. 10 to 13 are flow charts for explaining the process performed by a quick charging system according to a third embodiment. Since the functional configuration of the quick charging system according to the present embodiment is the same as that in the first or second embodiment, explanation thereof will not be repeated. In the present embodiment, the control unit 210 of the control device 200 of the quick charging system sets a power supply interruption time zone in advance, in which the supply of electrical power is interrupted. In addition, the control unit 210 sets the power supply interruption time zone when insufficiency of the amount of the stored electrical power of the storage battery 120 is expected. In addition, the control unit 210 performs a process of reducing the length of the power supply interruption time zone when insufficiency of the amount of the stored electrical power of the storage battery 120 is expected. Hereinafter, an example of the process will be described using a flow chart.

Figure 10:
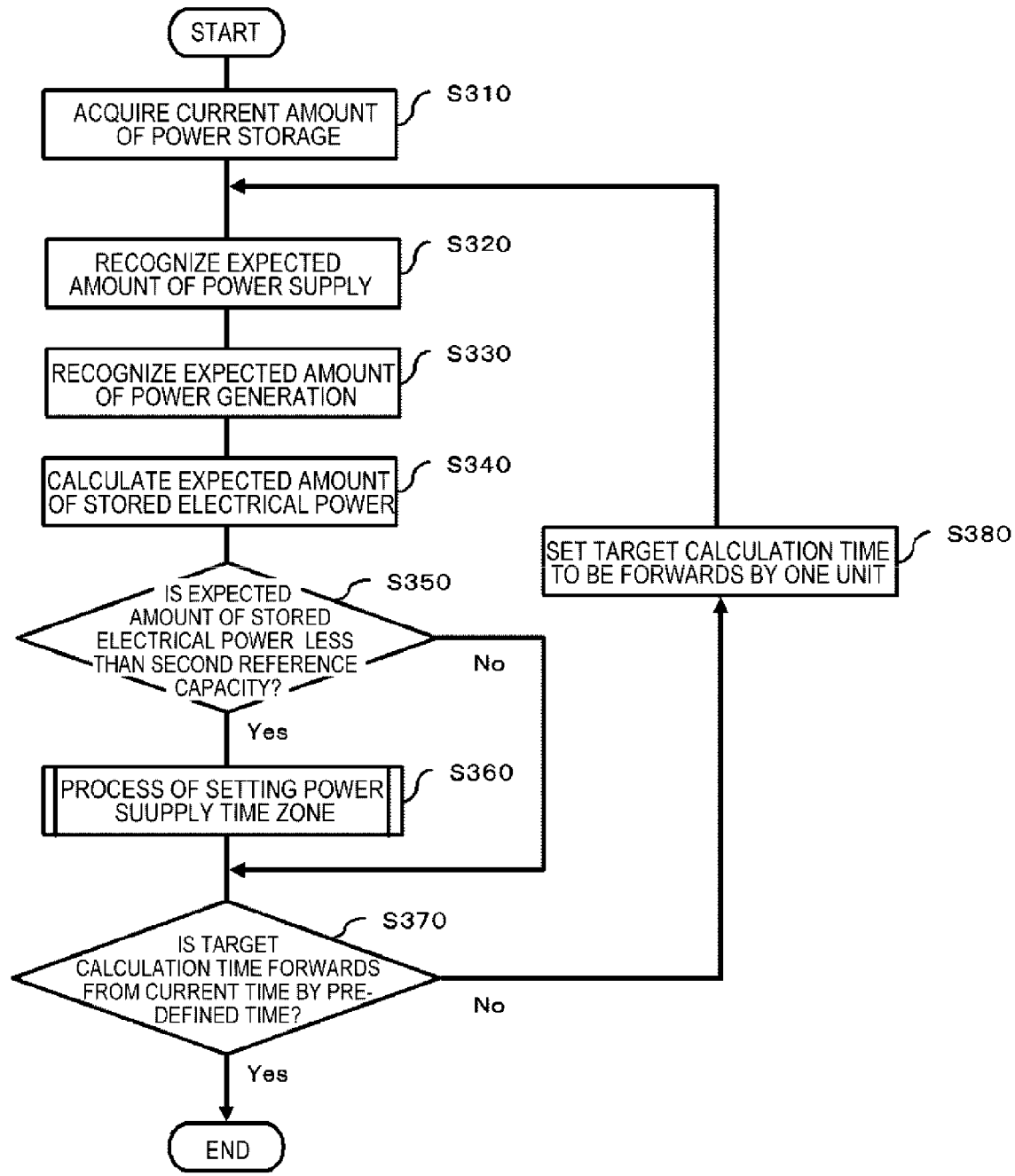
FIG. 10 is a flow chart for explaining the process performed by a quick charging system according to a third embodiment.

FIG. 10 is a flow chart illustrating the first control performed by the control unit 210 of the control device 200 in the present embodiment. The control unit 210 performs the process shown in FIG. 4 every fixed time, for example, every tens of milliseconds to hundreds of milliseconds.

First, the control unit 210 sets a time, which is one unit time (for example, 10 minutes) later than the current time, as the target calculation time. Then, the control unit 210 acquires the current amount of the stored electrical power of the storage battery 120 from the storage battery 120 (step S310). Then, the control unit 210 reads the first template data from the template storage unit 220 and calculates the expected amount of power supply by the power supply unit 110 in a period from the current time to the target calculation time, that is, the expected value of electrical power which needed to be supplied from the storage battery 120 to the battery 400 (step S320). In addition, the control unit 210 reads the second template data from the template storage unit 220 and calculates the expected amount of power generation by the power generation unit 160 in a period before the target calculation time from the current time (step S330).

In addition, the control unit 210 assumes that no electrical power is supplied from the power distribution network 300 to the storage battery 120 in a period from the current time to the target calculation time. In addition, the control unit 210 adds the expected amount of power generation calculated in step S330 to the current amount of the stored electrical power, and subtracts from this value the expected amount of power supply calculated in step S320. In this manner, the control unit 210 calculates the expected amount of the stored electrical power at the target calculation time (step S340).

The control unit 210 determines whether or not the expected amount of the stored electrical power calculated in step S340 is less than the second reference capacity (step S350). When the expected amount of the stored electrical power is less than the second reference capacity (step S350: Yes), the control unit 210 performs a process of setting the power supply time zone that is a time zone in which electrical power is supplied from the power distribution network 300 to the storage battery 120 (step S360), and then proceeds to step S370. When the expected amount of the stored electrical power is not less than the second reference capacity (step S350: No), the control unit 210 proceeds to step S370.

In step S370, the control unit 210 determines whether or not the target calculation time is forwards from the current time by a pre-defined time, for example, by 24 hours. When the target calculation time is forwards from the current time by the pre-defined time set (step S370: Yes), the control unit 210 ends the process. When the target calculation time is not forwards from the current time by the pre-defined time (step S370: No), the control unit 210 sets the target calculation time to be forwards by one unit time (for example, 10 minutes) (step S380), and then returns to step S320.

Figure 11:
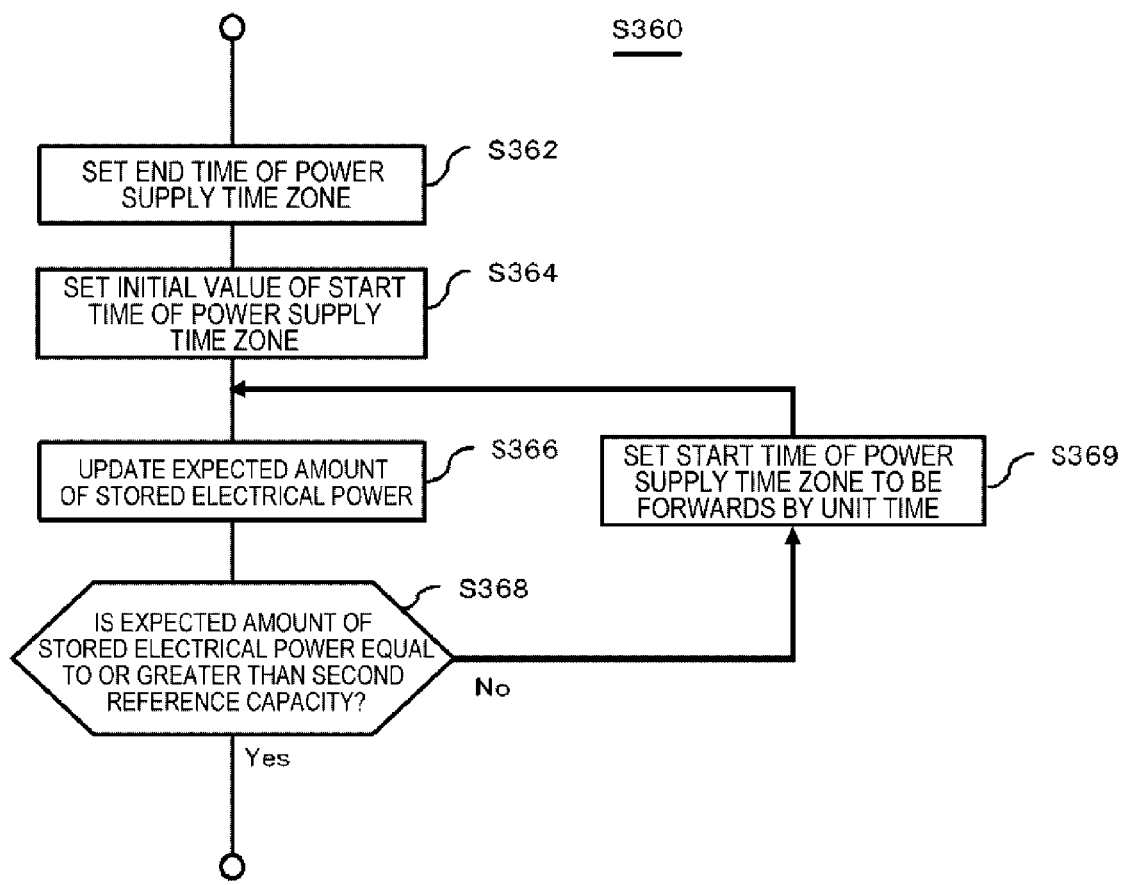
FIG. 11 is a flow chart for explaining the process performed by the quick charging system according to the third embodiment.

FIG. 11 is a flow chart showing the details of step S360 in FIG. 10, that is, the process of setting the power supply time zone. First, the control unit 210 sets the end time of the power supply time zone as the current target calculation time (step S362).

Then, the control unit 210 sets a time, which is one unit time (for example, 10 minutes) backwards from the current target calculation time, as an initial value of the start time of the power supply time zone (step S364). Then, the control unit 210 calculates the amount of power supply from the power distribution network 300 to the storage battery 120 in a period from the current time to the target calculation time after setting the power supply time zone. In addition, the control unit 210 adds the calculated amount of power supply and the expected amount of power generation calculated in step S330 to the current amount of the stored electrical power, and subtracts from this value the expected amount of power supply calculated in step S320. In this manner, the control unit 210 calculates the updated value of the expected amount of the stored electrical power at the target calculation time (step S366).

When the expected amount of the stored electrical power after updating is equal to or greater than the second reference capacity (step S368: Yes), the control unit 210 ends the process of setting the power supply time zone. In addition, when the expected amount of the stored electrical power after updating is less than the second reference capacity (step S368: No), the control unit 210 sets the start time of the power supply time zone to be forwards by one unit time (step S369), and then returns to step S366.

Figure 12:
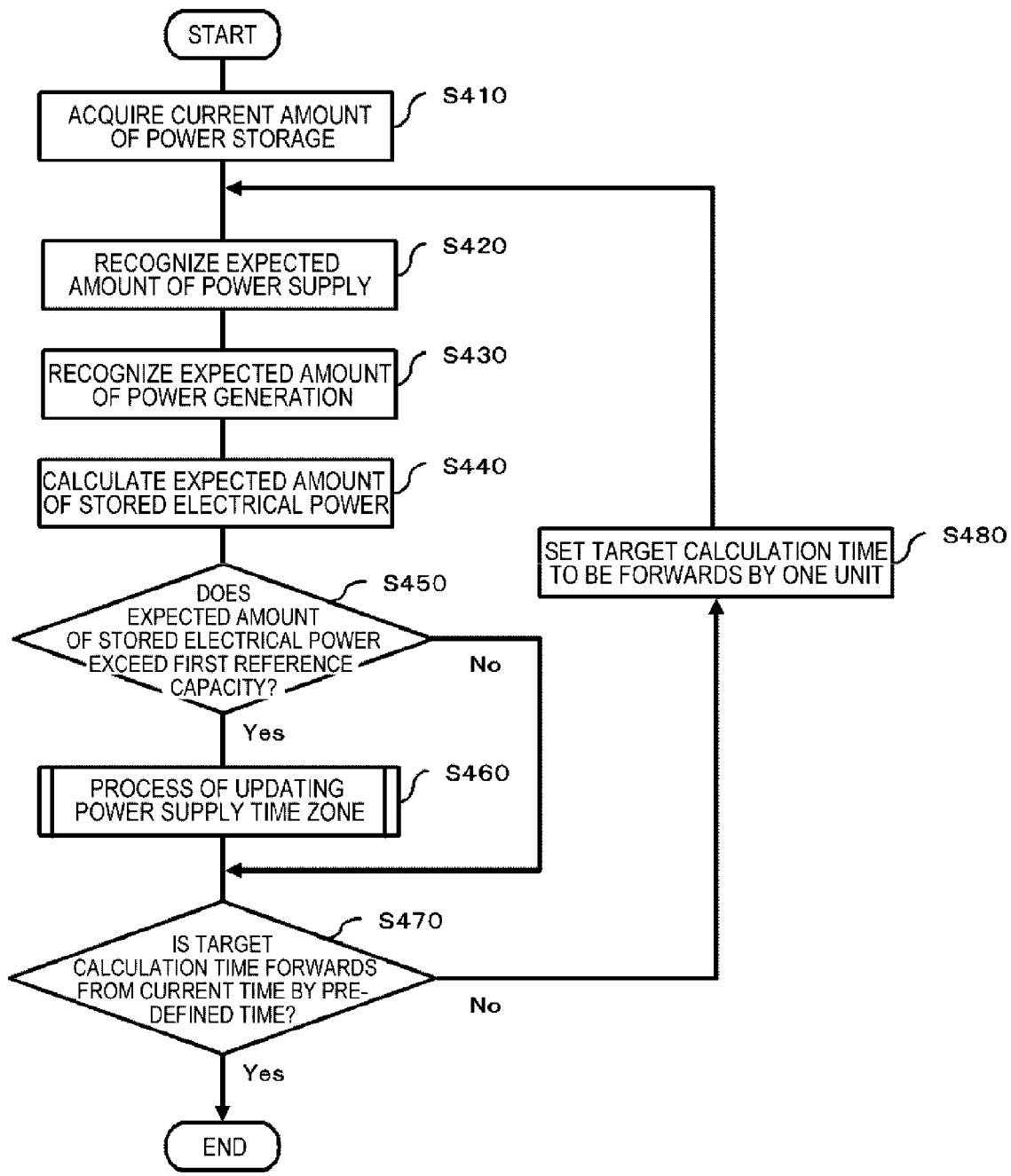
FIG. 12 is a flow chart for explaining the process performed by the quick charging system according to the third embodiment.

FIG. 12 is a flow chart illustrating the second control performed by the control unit 210 of the control device 200. In the process shown in FIGS. 10 to 11, the control unit 210 determines only whether or not the capacity of the storage battery 120 is less than the second reference capacity. For this reason, when the amount of power generation by the power generation unit 160 exceeds the expected value or when the amount of power supply from the storage battery 120 to the battery 400 is less than the expected value, the amount of the stored electrical power of the storage battery 120 may be too large. In such a case, it is necessary to shorten the power supply time zone set in the process shown in FIGS. 10 and 11.

FIG. 12 is a process of shortening the set power supply time zone. The control unit 210 performs the process shown in FIG. 12 every fixed time, for example, every tens of milliseconds to hundreds of milliseconds.

First, the control unit 210 sets a time, which is one unit time (for example, 10 minutes) later than the current time, as the target calculation time. In addition, the control unit 210 recognizes the first reference capacity. The first reference capacity is set to a higher value than the second reference capacity.

Then, the control unit 210 acquires the current amount of the stored electrical power of the storage battery 120 from the storage battery 120 (step S410). Then, the control unit 210 reads the first template data from the template storage unit 220 and calculates the expected amount of power supply in a period from the current time to the target calculation time (step S420). In addition, the control unit 210 reads the second template data from the template storage unit 220 and calculates the expected amount of power generation in a period from the current time to the target calculation time (step S430).

Note that, the process of steps S410 to S430 may be omitted if the result of the processing from step S310 to S330 shown in FIG. 10 remains in the control unit 210.

In addition, the control unit 210 calculates the amount of power supply from the power distribution network 300 to the storage battery 120 on the assumption that electrical power is supplied from the power distribution network 300 to the storage battery 120 only in the power supply time zone in a period from the current time to the target calculation time. In addition, the control unit 210 adds the calculated amount of power supply and the expected amount of power generation calculated in step S430 to the current amount of the stored electrical power, and subtracts from this value the expected amount of power supply calculated in step S420. In this manner, the control unit 210 calculates the expected amount of the stored electrical power at the target calculation time (step S440).

Here, the control unit 210 determines whether or not the expected amount of the stored electrical power calculated in step S440 exceeds the first reference capacity (step S450). When the expected amount of the stored electrical power calculated in step S440 exceeds the first reference capacity (step S450: Yes), the control unit 210 performs a process (an update process) of shortening the power supply time zone (step S460), and then proceeds to step S470. When the expected amount of the stored electrical power calculated in step S440 does not exceed the first reference capacity (step S450: No), the control unit 210 proceeds to step S470.

In step S470, the control unit 210 determines whether or not the target calculation time is forwards from the current time by a pre-defined time, for example, by 24 hours. When the target calculation time is forwards from the current time by the pre-defined time (step S470: Yes), the control unit 210 ends the process. When the target calculation time is not forwards from the current time by the pre-defined time (step S470: No), the control unit 210 sets the target calculation time to be forwards by one unit time (for example, 10 minutes) (step S480), and then returns to step S420.

Figure 13:
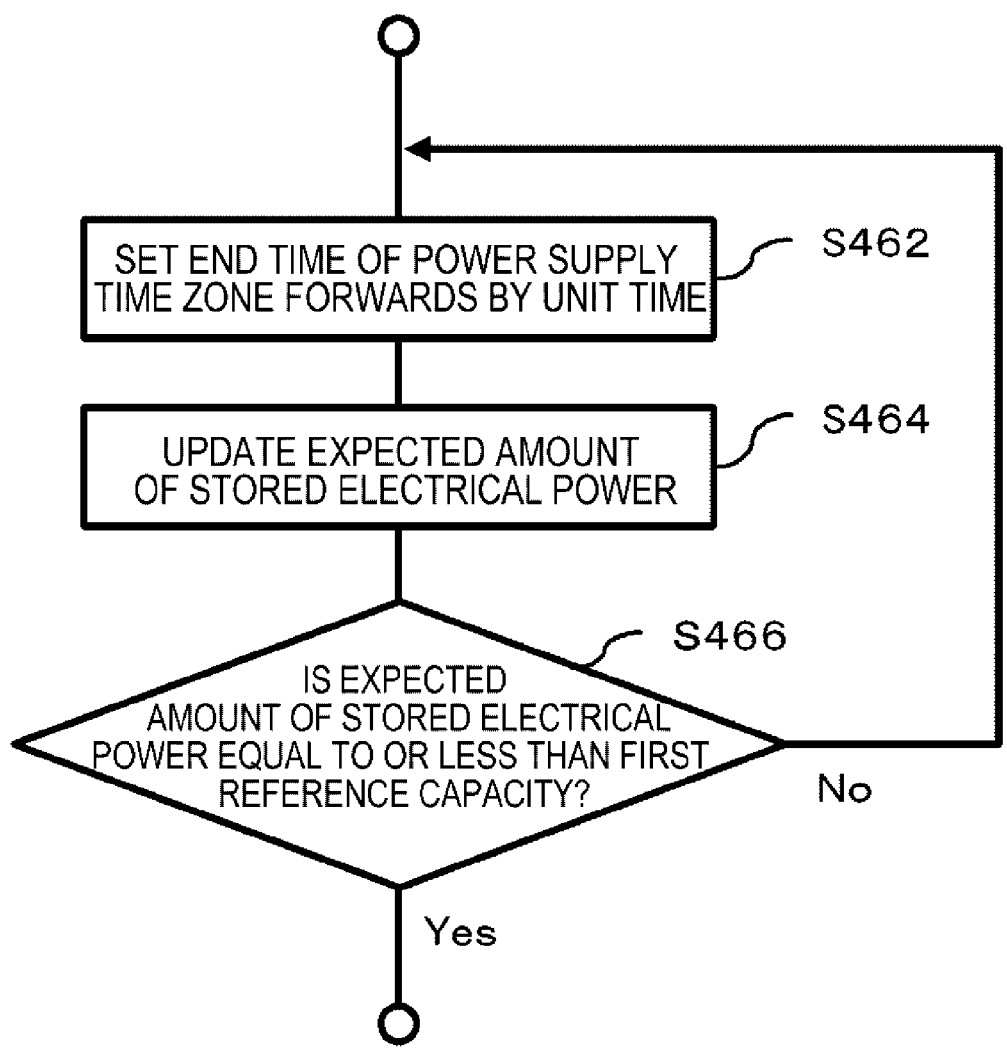
FIG. 13 is a flow chart for explaining the process performed by the quick charging system according to the third embodiment.

FIG. 13 is a flow chart showing the details of step S460 in FIG. 12, that is, the process of shortening the power supply time zone. First, the control unit 210 sets the end time of the power supply time zone to be backwards by one unit time, for example, by 10 minutes (step S462). Then, the control unit 210 calculates the amount of power supply from the power distribution network 300 to the storage battery 120 in a period from the current time to the target calculation time after shortening the power supply time zone. In addition, the control unit 210 adds the calculated amount of power supply and the expected amount of power generation calculated in step S430 to the current amount of the stored electrical power, and subtracts from this value the expected amount of power supply calculated in step S420. In this manner, the control unit 210 calculates the updated value of the expected amount of the stored electrical power at the target calculation time (step S464).

When the expected amount of the stored electrical power after updating is equal to or less than the first reference capacity (step S466: Yes), the control unit 210 ends the process of shortening the power supply time zone. In addition, when the expected amount of the stored electrical power after updating still exceeds the first reference capacity (step S466: No), the control unit 210 returns to step S462.

Note that, in step S462, the start time of the power supply time zone may be delayed by one unit time, for example, by 10 minutes.

Also in the present embodiment, electrical power generated by the power generation unit 160 using renewable energy can be stored to the fullest extent in a power storage unit. In addition, by setting the first reference capacity to a high value, for example, to the maximum capacity of the storage battery 120, it is suppressed that the amount of the stored electrical power of the storage battery 120 becomes insufficient when supplying electrical power to the battery 400.

While the embodiments of the present invention have been described with reference to the drawings, these are only illustrations of the present invention, and other various configurations may also be adopted.

For example, although the supply of electrical power from the power distribution network 300 to the storage battery 120 is interrupted in the power reduction time zone in the first embodiment, the supply of electrical power may be reduced instead of interrupting the supply of electrical power.

This application claims priority to Japanese Patent Application No. 2010-284958, filed on Dec. 21, 2010, the entire contents of which are incorporated herein.

The invention claimed is:

1. A quick charging system comprising:
   a power storage unit;
   a power supply unit that supplies electrical power stored in the power storage unit to a battery of another apparatus;
   a power distribution unit that distributes electrical power of a power distribution network to the power storage unit so as to store the electrical power in the power storage unit;
   a power generation unit that generates electrical power using renewable energy and stores the generated electrical power in the power storage unit; and
   a control unit that controls the power distribution unit,
   wherein the control unit is configured to perform:
      a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and electrical power continues to be supplied from the power distribution network to the power storage unit according to settings, and a second process of calculating a power reduction time zone, which is a time zone in which a supply of electrical power from the power distribution unit to the power storage unit is controlled to be reduced or stopped, based on a determination of a first time, which is a time when the expected amount of the stored electrical power starts to exceed a first reference capacity, and which is determinable based on the transition of the expected amount of the stored electrical power of the power storage unit, wherein the second process is performed at a time before the first time, and wherein a start time of the power reduction time zone precedes the first time.

2. The quick charging system according to claim 1, wherein, in the second process, the control unit calculates the expected amount of the stored electrical power at the first time when the power reduction time zone is set, repeatedly performs a process of determining whether or not the calculated expected amount of the stored electrical power is less than the first reference capacity of the power storage unit while setting a start time of the power reduction time zone to be backwards by units of a predetermined time, and ends the second process when the calculated expected amount of the stored electrical power becomes less than the first reference capacity.

3. The quick charging system according to claim 1, wherein the control unit has a first value, which is used in a first time zone, and a second value, which is used in a second time zone later than the first time zone, as the first reference capacity of the power storage unit, wherein the first value is a maximum capacity of the power storage unit, and wherein the second value is a minimum value required in the quick charging system.

4. The quick charging system according to claim 3, wherein the second time zone is immediately before a time zone in which a midnight power rate is applied as a rate of electrical power supplied from the power distribution network, and wherein the first time zone is a time zone excluding the second time zone in a day.

5. The quick charging system according to claim 1, wherein, after the power reduction time zone is set, the control unit performs:
  a third process of calculating a transition of an expected amount of the stored electrical power of the power storage unit, on the basis of the transition of the expected amount of power generation of the power generation unit, the transition of the expected amount of power supply of the power supply unit, and the current amount of the stored electrical power of the power storage unit, in a case where the power distribution unit continues to supply electrical power to the power storage unit except for the power reduction time zone, and
  a fourth process of shortening the power reduction time zone when presence of a second time, which is a time when the expected amount of the stored electrical power starts to be less than a second reference capacity set as a lower value than the first reference capacity, is shown in the transition of the expected amount of the stored electrical power of the power storage unit.

6. The quick charging system according to claim 5, wherein, in the fourth process, the control unit calculates the expected amount of the stored electrical power at the second time when the power reduction time zone is set, repeatedly performs a process of determining whether or not the calculated expected amount of the stored electrical power is larger than the second reference capacity of the power storage unit while shortening the power reduction time zone by units of a predetermined time, and ends the fourth process when the calculated expected amount of the stored electrical power becomes larger than the second reference capacity.

7. The quick charging system according to claim 1, further comprising:

a template storage unit that stores template data showing a standard transition of each of the amount of power supply by the power supply unit and the amount of power generation by the power generation unit, wherein the control unit recognizes the transition of the expected amount of power generation and the transition of the expected amount of power supply using the template data.

8. The quick charging system according to claim 7, further comprising:

a history storage unit that stores history data of each of the amount of power supply by the power supply unit and the amount of power generation by the power generation unit; and a template generation unit that generates the template data of each of the amount of power supply and the amount of power generation on the basis of the history data.

9. The quick charging system according to claim 1, wherein the power generation unit is a solar battery.

10. The quick charging system according to claim 1, wherein the quick charging system is a power station, and the another apparatus is an electrical vehicle.

11. A quick charging system comprising:

a power storage unit;

a power supply unit that supplies electrical power stored in the power storage unit to a battery of another apparatus;

a power distribution unit that distributes electrical power of a power distribution network to the power storage unit so as to store the electrical power in the power storage unit;

a power generation unit that generates electrical power using renewable energy and stores the generated electrical power in the power storage unit; and a control unit that controls the power distribution unit, wherein the control unit is configured to perform:
  a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and electrical power continues to be supplied from the power distribution network to the power storage unit according to settings, and
  a second process of calculating a power supply time zone, which is a time zone in which electrical power is controlled to be supplied from the power distribution unit to the power storage unit, based on a determination of a second time, which is a time when the expected amount of the stored electrical power starts to be less than a second reference capacity, and which is determinable based on the transition of the expected amount of the stored electrical power of the power storage unit, wherein the second process is performed at a time before the second time, and wherein a start time of the power supply time zone precedes the second time.

12. The quick charging system according to claim 11, wherein, in the second process, the control unit calculates the expected amount of the stored electrical power at the second time when the power supply time zone is set, repeatedly performs a process of determining whether or not the calculated expected amount of the stored electrical power is larger than the second reference capacity of the power storage unit while setting a start time of the power supply time zone to be backwards by units of a predetermined time, and ends the second process when the calculated expected amount of the stored electrical power exceeds the second reference capacity.

13. The quick charging system according to claim 11, wherein, after the power supply time zone is set, the control unit performs:

a third process of calculating, on the basis of the transition of the expected amount of power generation of the power generation unit, the transition of the expected amount of power supply of the power supply unit, and the current amount of the stored electrical power of the power storage unit, a transition of an expected amount of the stored electrical power of the power storage unit when the power distribution unit continues to supply electrical power to the power storage unit in the power supply time zone; and a fourth process of shortening the power supply time zone when presence of a first time, which is a time when the expected amount of the stored electrical power starts to exceed a first reference capacity set as a higher value than the second reference capacity, is shown in the transition of the expected amount of the stored electrical power of the power storage unit.

14. The quick charging system according to claim 13, wherein, in the fourth process, the control unit calculates the expected amount of the stored electrical power at the first time when the power supply time zone is set, repeatedly performs a process of determining whether or not the calculated expected amount of the stored electrical power is less than the first reference capacity of the power storage unit while shortening the power supply time zone by units of a predetermined time, and ends the fourth process when the calculated expected amount of the stored electrical power becomes less than the first reference capacity.

15. A control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, wherein the control device is configured to perform a first process which includes calculating a transition of an expected amount of stored electrical power of the power storage unit on the basis of a transition of an expected amount of power generation of the power generation unit, a transition of an expected amount of power supply of the power supply unit, and a current amount of stored electrical power of the power storage unit, in a case where each of the expected amount of power generation and the expected amount of power supply follows the transition and electrical power continues to be supplied from the power distribution network to the power storage unit according to settings, and wherein the control device is further configured to perform a second process which includes calculating a power reduction time zone, which is a time zone in which an amount of power supply from the power distribution unit to the power storage unit is controlled to be reduced or stopped, based on a determination of a first time, which is a time when the expected amount of the stored electrical power starts to exceed a first reference capacity, and which is determinable based on the transition of the expected amount of the stored electrical power of the power storage unit, wherein the second process is performed at a time before the first time, and wherein a start time of the power reduction time zone precedes the first time.

16. A control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, wherein the control device is configured to perform a first process which includes calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and a supply of electrical power from the power distribution network to the power storage unit continues to be interrupted according to settings, and wherein the control device is configured to perform a second process which includes calculating a power supply time zone, which is a time zone in which electrical power is controlled to be supplied from the power distribution unit to the power storage unit, based on a determination of a second time, which is a time when the expected amount of the stored electrical power starts to be less than a second reference capacity, and which is determinable based on the transition of the expected amount of the stored electrical power of the power storage unit, wherein the second process is performed at a time before the second time, and wherein a start time of the power supply time zone precedes the second time.

17. A method of controlling, using a control device, an amount of stored electrical power in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit, the method comprising:

performing, by the control device, a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the expected amount of power generation and the expected amount of power supply follows the transition and electrical power continues to be supplied from the power distribution network to the power storage unit according to settings, and performing, by the control device, a second process of calculating a power reduction time zone, which is a time zone in which an amount of power supply from the power distribution unit to the power storage unit is controlled to be reduced or stopped, based on a determination of a first time, which is a time when the expected amount of the stored electrical power starts to exceed a first reference capacity, and which is determinable based on the transition of the expected amount of the stored electrical power of the power storage unit, wherein the second process is performed at a time before the first time, and wherein a start time of the power reduction time zone precedes the first time.

18. A method of controlling, using a control device, an amount of stored electrical power in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit, the method comprising:

performing, by the control device, a first process of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where when each of the amount of power generation of the power generation unit and the amount of power supply of the power supply unit follows the transition and a supply of electrical power from the power distribution network to the power storage unit continues to be interrupted according to settings, and performing, by the control device, a second process of calculating a power supply time zone, which is a time zone in which electrical power is controlled to be supplied from the power distribution unit to the power storage unit, based on a determination of a second time, which is a time when the expected amount of the stored electrical power starts to be less than a second reference capacity, and which is determinable based on the transition of the expected amount of the stored electrical power of the power storage unit, wherein the second process is performed at a time before the second time, and wherein a start time of the power supply time zone precedes the second time.

19. A non-transitory computer readable medium that includes a program for implementing a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, the program causing a computer to implement:

a first function of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the expected amount of power generation and the expected amount of power supply follows the transition and electrical power continues to be supplied from the power distribution network to the power storage unit according to settings; and a second function of calculating a power reduction time zone, which is a time zone in which an amount of power supply from the power distribution unit to the power storage unit is controlled to be reduced or stopped, based on a determination of a first time, which is a time when the expected amount of the stored electrical power starts to exceed a first reference capacity, and which is determinable based on the transition of the expected amount of the stored electrical power of the power storage unit, wherein the second function is performed at a time before the first time, and wherein a start time of the power reduction time zone precedes the first time.

20. A non-transitory computer readable medium that includes a program for implementing a control device that is used in a quick charging system including a power storage unit, a power supply unit that supplies electrical power stored in the power storage unit to a battery of another apparatus, a power distribution unit that distributes electrical power of a power distribution network to the power storage unit so as to store the electrical power in the power storage unit, and a power generation unit that generates electrical power using renewable energy and stores the generated electrical power in the power storage unit and that controls a supply of electrical power from the power distribution network to the power storage unit, the program causing a computer to implement:

a first function of calculating a transition of an expected amount of stored electrical power of the power storage unit on the basis of a transition of an expected amount of power generation of the power generation unit, a transition of an expected amount of power supply of the power supply unit, and a current amount of the stored electrical power of the power storage unit, in a case where each of the amount of power generation of the power generation unit and the amount of power supply of the power supply unit follows the transition and a supply of electrical power from the power distribution network to the power storage unit continues to be interrupted according to settings; and a second function of calculating a power supply time zone, which is a time zone in which electrical power is controlled to be supplied from the power distribution unit to the power storage unit, based on a determination of a second time, which is a time when the expected amount of the stored electrical power starts to be less than a second reference capacity, and which is determinable based on the transition of the expected amount of the stored electrical power of the power storage unit, wherein the second function is performed at a time before the second time, and wherein a start time of the power supply time zone precedes the second time.

\* \* \* \* \*